(12) United States Patent
Hattab et al.

(10) Patent No.: US 10,286,923 B1
(45) Date of Patent: May 14, 2019

(54) TIRE VIBRATION AND LOOSE WHEEL DETECTION

(71) Applicant: Ford Global Technologies, LLC, Dearborn, MI (US)

(72) Inventors: Oussama Hattab, Houston, TX (US); Fakhreddine Landolsi, Canton, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/814,360

(22) Filed: Nov. 15, 2017

(51) Int. Cl.
*B60W 50/16* (2012.01)
*G05D 1/02* (2006.01)
*B60W 40/10* (2012.01)
*G01M 1/14* (2006.01)

(52) U.S. Cl.
CPC ............ *B60W 50/16* (2013.01); *B60W 40/10* (2013.01); *G05D 1/0278* (2013.01); *B60W 2400/00* (2013.01); *B60W 2510/081* (2013.01); *G01M 1/14* (2013.01)

(58) Field of Classification Search
USPC .......................................................... 701/36
See application file for complete search history.

(56) References Cited

U.S. PATENT DOCUMENTS

| | | | |
|---|---|---|---|
| 6,481,271 B1 | 11/2002 | Ward et al. | |
| 6,993,449 B2 | 1/2006 | Koebe et al. | |
| 7,205,886 B2 | 4/2007 | Kin | |
| 8,060,305 B2* | 11/2011 | Kimura ................. | B60W 40/02 340/436 |
| 9,548,077 B1 | 1/2017 | Harper et al. | |
| 2003/0172728 A1* | 9/2003 | Gustafsson ........... | B60C 23/061 73/146 |
| 2006/0265154 A1 | 11/2006 | Potts | |
| 2007/0299573 A1 | 12/2007 | Carlstrom | |
| 2008/0137062 A1* | 6/2008 | Holton .................... | G01P 3/366 356/28 |
| 2008/0243327 A1* | 10/2008 | Bujak ................... | B60W 30/12 701/33.7 |
| 2009/0139327 A1 | 6/2009 | Dagh et al. | |
| 2010/0185414 A1* | 7/2010 | Yamamoto ........ | B60W 50/0205 702/183 |
| 2013/0049952 A1* | 2/2013 | Schnare .................. | F16B 31/02 340/539.1 |
| 2013/0088346 A1* | 4/2013 | Broadfield ............... | B60B 3/16 340/438 |
| 2013/0180324 A1* | 7/2013 | Sota ...................... | B60C 23/062 73/146 |

(Continued)

FOREIGN PATENT DOCUMENTS

WO     2016120019 A1    8/2016

*Primary Examiner* — Tyler D Paige
(74) *Attorney, Agent, or Firm* — Frank A. MacKenzie; Bejin Bieneman PLC

(57) ABSTRACT

A vehicle computer includes a memory and a processor programmed to execute instructions stored in the memory. The instructions include receiving a wheel speed from a wheel speed sensor, receiving a vehicle speed from a vehicle speed sensor, determining a mean vibration magnitude in accordance with the wheel speed and the vehicle speed, and detecting a vibrating vehicle wheel based on the mean vibration magnitude.

14 Claims, 4 Drawing Sheets

(56) References Cited

U.S. PATENT DOCUMENTS

| | | | |
|---|---|---|---|
| 2015/0331422 A1* | 11/2015 | Hartung | G05D 1/021 |
| | | | 701/23 |
| 2017/0046216 A1* | 2/2017 | Stenneth | G06F 11/0793 |
| 2017/0084094 A1 | 3/2017 | Worden et al. | |
| 2018/0095008 A1* | 4/2018 | Kusumi | B60B 3/16 |
| 2018/0181087 A1* | 6/2018 | Komatsu | G05B 13/028 |

* cited by examiner

TIRE VIBRATION AND LOOSE WHEEL DETECTION

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
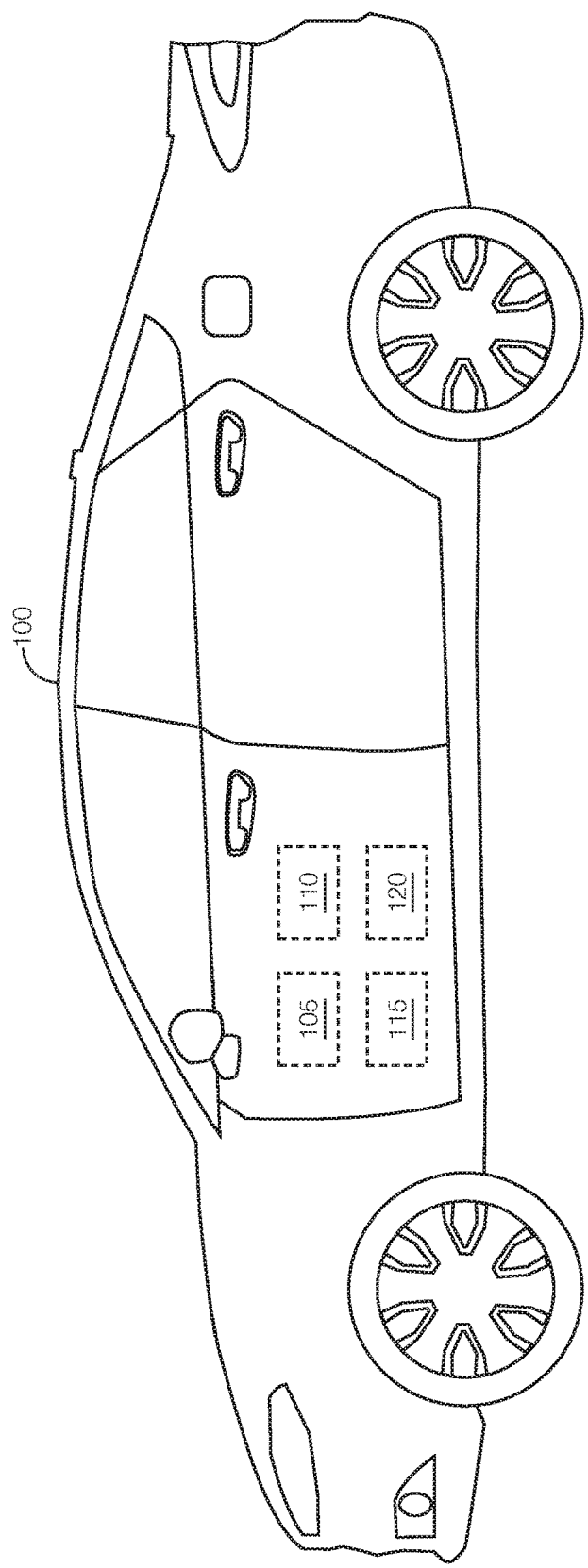
FIG. 1 illustrates an example autonomous vehicle with tire vibration and loose wheel detection.

In a vehicle, excessive tire vibrations may occur when one or more of the bolts securing the tire to the vehicle chassis becomes loose. Tire vibrations can also occur under other circumstances such as wheel imbalance. Human drivers can often feel when a tire is vibrating excessively. Excessive tire vibrations, however, are less noticeable to the virtual driver system of an autonomous vehicle.

A vehicle computer with a memory and a processor, programmed to execute instructions stored in the memory, can detect tire vibrations and a loose vehicle wheel. The instructions stored in the memory include receiving a wheel speed from a wheel speed sensor, receiving a vehicle speed from a vehicle speed sensor, determining a mean vibration magnitude in accordance with the wheel speed and the vehicle speed, and detecting a vibrating vehicle wheel based on the mean vibration magnitude.

In the vehicle computer, the processor may be programmed to identify a speed range from the vehicle speed. In that instance, the processor may be programmed to estimate a wheel radius from the wheel speed sensor. Further, the processor may be programmed to select a frequency bin of interest according to the speed range and the estimated wheel radius. Moreover, the processor may be programmed to generate an intermediate signal for the vehicle wheel based on the wheel speed and the selected frequency bin of interest. The processor may be further programmed to determine the mean vibration magnitude based at least in part on the intermediate signal.

In the vehicle computer, the processor may be programmed to recursively determine the mean vibration magnitude.

In the vehicle computer, the processor may be programmed to detect the vibrating vehicle wheel by comparing the mean vibration magnitude to a threshold. In that instance, the processor may be programmed to detect the vibrating vehicle wheel as a result of determining that the mean vibration magnitude exceeds the threshold.

In the vehicle computer, the processor may be programmed to autonomously operate a host vehicle in accordance with a remedial action as a result of detecting the vibrating vehicle wheel.

A method includes receiving a wheel speed from a wheel speed sensor, receiving a vehicle speed from a vehicle speed sensor, determining a mean vibration magnitude in accordance with the wheel speed and the vehicle speed, and detecting a vibrating vehicle wheel based on the mean vibration magnitude.

The method may further include identifying a speed range from the vehicle speed. In that instance, the method may further include estimating a wheel radius from the wheel speed sensor. The method may further include selecting a frequency bin of interest according to the speed range and the estimated wheel radius. The method may further include generating an intermediate signal for the vehicle wheel based on the wheel speed and the selected frequency bin of interest. The method may further include determining the mean vibration magnitude based at least in part on the intermediate signal.

The method may further include determining the mean vibration magnitude includes recursively determining the mean vibration magnitude.

The method may further include detecting the vibrating vehicle wheel includes comparing the mean vibration magnitude to a threshold. In that instance, the method may further include detecting the vibrating vehicle wheel includes detecting the vibrating vehicle wheel as a result of determining that the mean vibration magnitude exceeds the threshold.

The method may further include autonomously operating a host vehicle in accordance with a remedial action as a result of detecting the vibrating vehicle wheel.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 2:
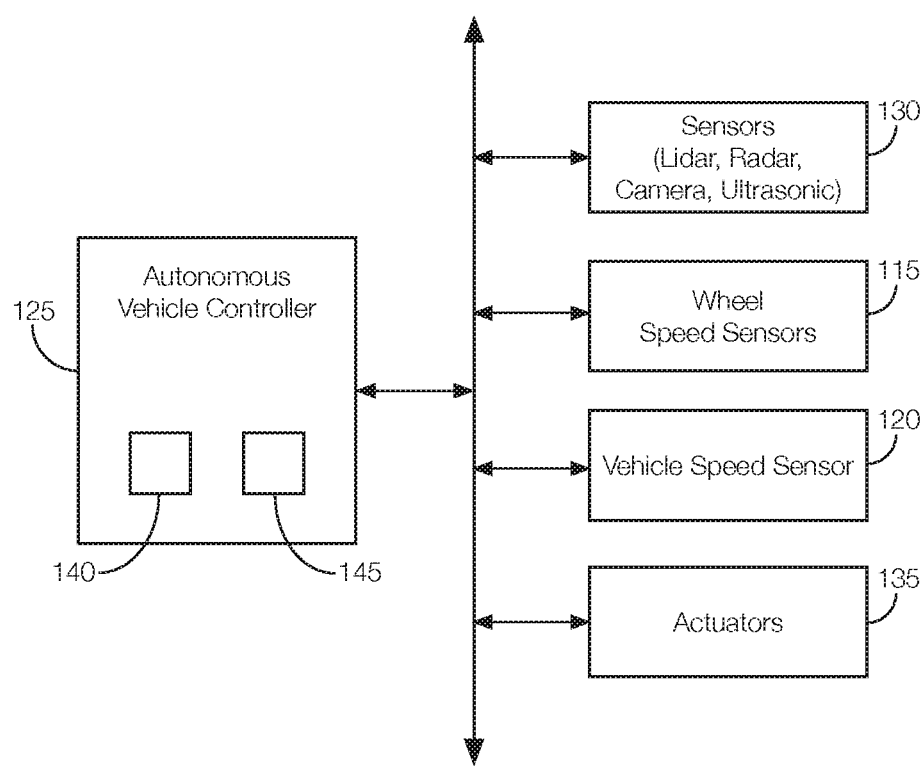
FIG. 2 is a block diagram showing example components of the autonomous vehicle that are used to detect tire vibration and a loose wheel.

As illustrated in FIGS. 1 and 2, the autonomous host vehicle 100 includes a virtual driver system 105, an automated vehicle platform 110, wheel speed sensors 115, and a vehicle speed sensor 120. At least some parts of the virtual driver system 105 may be implemented by a vehicle computer. Although illustrated as a sedan, the host vehicle 100 may be any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode.

The virtual driver system 105 is a computing platform, implemented via sensors, controllers, circuits, chips, and other electronic components, that control various autonomous operations of the host vehicle 100. The virtual driver system 105 includes an autonomous vehicle controller 125, implemented via circuits, chips, or other electronic components, programmed to process the data captured by the sensors 130, which may include a lidar sensor, a radar sensor, a camera, ultrasonic sensors, etc. The autonomous vehicle controller 125 is programmed to output control signals to components of the automated vehicle platform 110 to autonomously control the host vehicle 100 according to the data captured by the sensors.

The automated vehicle platform 110 refers to the components that carry out the autonomous vehicle operation upon instruction from the virtual driver system 105, and specifically, from the autonomous vehicle controller 125. As such, the automated vehicle platform 110 includes various actuators 135 incorporated into the host vehicle 100 that control the steering, propulsion, and braking of the host vehicle 100. Each actuator 135 is controlled by control signals output by the autonomous vehicle controller 125. The actuator 135 may convert the electrical control signals into mechanical motion that causes the steering wheel, accelerator pedal, brake pedal, etc. to move. Examples of actuators 135 include linear actuators, servo motors, or the like. The automated vehicle platform 110 further includes various platform controllers (sometimes referred to in the art as "modules"), such as a chassis controller, a powertrain controller, a body controller, an electrical controller, etc.

The wheel speed sensors 115 are implemented via circuits, chips, or other electronic components programmed to measure the speed of the wheels of the host vehicle 100. Each wheel speed sensor 115 may be associated with one of the vehicle wheels, and as such, each wheel speed sensor 115 may be programmed to measure the speed of its respective wheel. The wheel speed sensor 115 may be programmed to calculate wheel speed based on, e.g., the number of times the wheel rotates within a certain period of time. Thus, the units of the wheel speed may be rotations per unit of time. The wheel speed sensors 115 may be programmed to output their respective wheel speed measurements to the autonomous vehicle controller 125.

The vehicle speed sensor 120 is implemented via circuits, chips, or other electronic components programmed to measure the speed of the host vehicle 100. In some instances, the vehicle speed sensor 120 may be programmed to calculate or measure the speed of the host vehicle 100 relative to the driveshaft speed. Alternatively or in addition, the vehicle speed can be determined from, e.g., GPS data based on the distance the vehicle travels in a certain period of time. The units of the vehicle speed may be distance travelled per unit of time. The vehicle speed sensor 120 may be programmed to output the vehicle speed to the autonomous vehicle controller 125. In some instances, the vehicle speed sensor 120 is incorporated into the autonomous vehicle controller 125. That is, the autonomous vehicle controller 125 may be programmed to calculate the vehicle speed from, e.g., the number of driveshaft rotations, GPS data, etc.

The autonomous vehicle controller 125 is implemented via circuits, chips, or other electronic components, including a memory 140 and a processor 145. The memory 140 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 140 may store instructions executable by the processor 145 and data such as data output by the wheel speed sensors 115, the vehicle speed sensor 120, various thresholds discussed below, etc. The instructions and data stored in the memory 140 may be accessible to the processor 145 and possibly other components of the host vehicle 100. The processor 145 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. As a result of the programming of the processor 145, the autonomous vehicle controller 125 receives the data from the wheel speed sensors 115 and the vehicle speed sensor 120, among others, and determines, from the data, whether one or more tires of the host vehicle 100 are vibrating excessively, whether one or more wheels is loose, or both.

The autonomous vehicle controller 125 may be programmed to determine whether the tires are excessively vibrating and whether a vehicle wheel is loose based, at least in part, on certain entry conditions. The entry conditions refer to conditions under which the decisions of the autonomous vehicle controller 125 concerning tire vibrations and a loose wheel are more likely to be accurate. Examples of entry conditions may include a low yaw (e.g., the host vehicle 100 is generally traveling in a straight line), the host vehicle 100 accelerating or traveling at a relatively constant speed (e.g., the brake is not being applied), the vehicle speed being above a certain threshold, etc.

Figure 3:
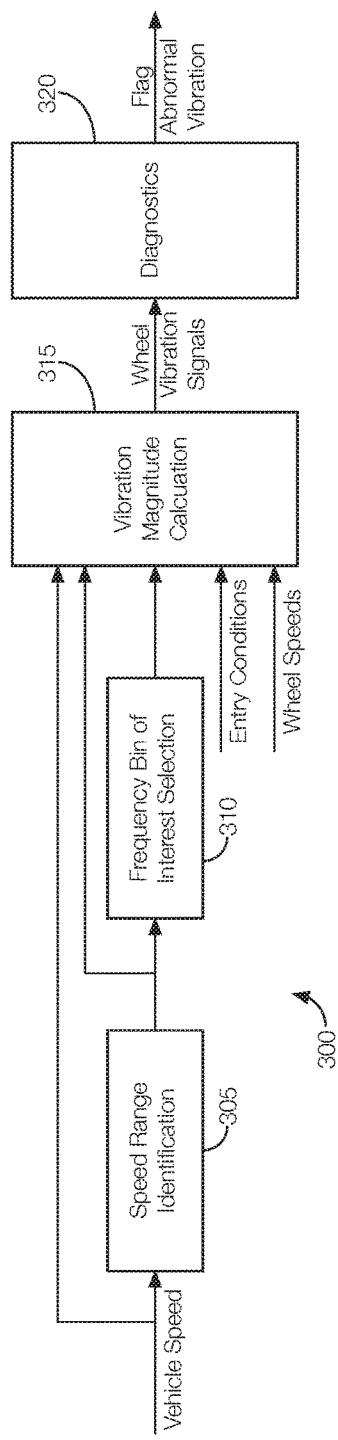
FIG. 3 is a block diagram illustrating a tire vibration detection.

FIG. 3 is a block diagram 300 illustrating how the processor 145 of the autonomous vehicle controller 125 is programmed to determine whether the tires are excessively vibrating. The autonomous vehicle controller 125 is programmed to determine whether certain entry conditions exist. The entry conditions considered by the autonomous vehicle controller 125 for detecting excessive tire vibrations may include determining whether the vehicle yaw is approximately zero (which would indicate that the host vehicle 100 is travelling in a straight line) and determining that the host vehicle 100 is not decelerating (e.g., the brakes are not being applied). If both entry conditions exist, the autonomous vehicle controller 125 may proceed to determine whether one or more tires are excessively vibrating.

At block 305, the autonomous vehicle controller 125 may determine whether the speed of the host vehicle 100 is within a certain range. The autonomous vehicle controller 125 may do so by receiving the output of the vehicle speed sensor 120 and identifying a range of speeds associated with the output of the vehicle speed sensor 120.

At block 310, the autonomous vehicle controller 125 may select a frequency bin of interest. The frequency bin of interest selected may be a function of the vehicle speed. Moreover, each frequency bin may be defined by a minimum frequency, $f_{min}$, and a maximum frequency, $f_{max}$.

At block 315, the autonomous vehicle controller 125 may calculate the vibration magnitude for each tire. That is, the autonomous vehicle controller 125 may receive the wheel speeds output by each of the wheel speed sensors 115, the vehicle speed output by the vehicle speed sensor 120, the frequency bin of interest determined at block 310, and the entry conditions. Calculating the vibration magnitude for each tire may occur in stages. One stage may include recursively calculating an intermediate signal $s(n)$, as shown in Equation 1, $$s(n) = x(n) + 2\cos(\omega_0)s(n-1) - s(n-2) \quad (1)$$

where x(n) is the wheel speed sequence x(0), ... x(N-1). A second stage may include applying a filter to s(n) to produce an output sequence y(n), as shown in Equation 2.

$$y(n) = s(n) - e^{-j\omega_0}s(n-1) \quad (2)$$

A transfer function may be defined as:

$$\frac{Y(z)}{X(z)} = \frac{1}{1 - e^{+j\omega_0}z^{-1}} \quad (3)$$

The output y(n) in the time domain may be defined as:

$$y(n) = e^{j\omega_0 n}\sum_{m=0}^{n}x(m)e^{-j\omega_0 m} \quad (4)$$

The power spectrum may be determined as follows. First, defining $$\omega_0 = 2\pi\frac{k}{N} \quad (5)$$

where k is the bin of frequency of interest, leads to Equation 6.

$$y(N-1) = e^{j2\pi\frac{N-1}{N}}\sum_{n=0}^{N-1}x(n)e^{-j2\pi\frac{nk}{N}} \quad (6)$$

The power spectrum of the wheel speed signal x(n) at the frequency of interest is given by $$|X(k)|^2 = |Y(N-1)|^2 = y(N-1)y'(N-1) \quad (7)$$

since $$\left|e^{j2\pi\frac{N-1}{N}}\right| = 1 \quad (7)$$

Accordingly, the vibration magnitude can be calculated using Equation 8.

$$|X(k)|^2 = s^2(N-1) + s^2(N-1) - 2\cos\left(2\pi\frac{k}{N}\right)s(N-1)s(N-2) \quad (8)$$

The autonomous vehicle controller 125 may be programmed to calculate the magnitude of the vibration on the order of, e.g., every 2 seconds while the vehicle speed is within a range of, e.g., 5 mph since those vehicle speeds would have the same frequency bin of interest. Moreover, with this approach, the ranges are determined based on instantaneous vehicle speed, and the autonomous vehicle controller 125 may be programmed to detect excessive tire vibration according to a recursive mean. The wheel vibration signals from Equation 8 are output to block 320.

At block 320, the autonomous vehicle controller 125 compares the wheel vibration signals to thresholds. If the vibration of one or more wheels exceeds the threshold, the autonomous vehicle controller 125 is programmed to set a flag indicating excessive (or abnormal) tire vibration. Setting a flag may include setting a diagnostic trouble code. The autonomous vehicle controller 125 may be further programmed to take another action such as presenting an alert inside the host vehicle 100, selecting a minimum risk condition event, or the like. Minimum risk condition events may include autonomously operating the host vehicle 100 to pull over to the side of the road, stop in the lane, or travel to a service station.

Figure 4:
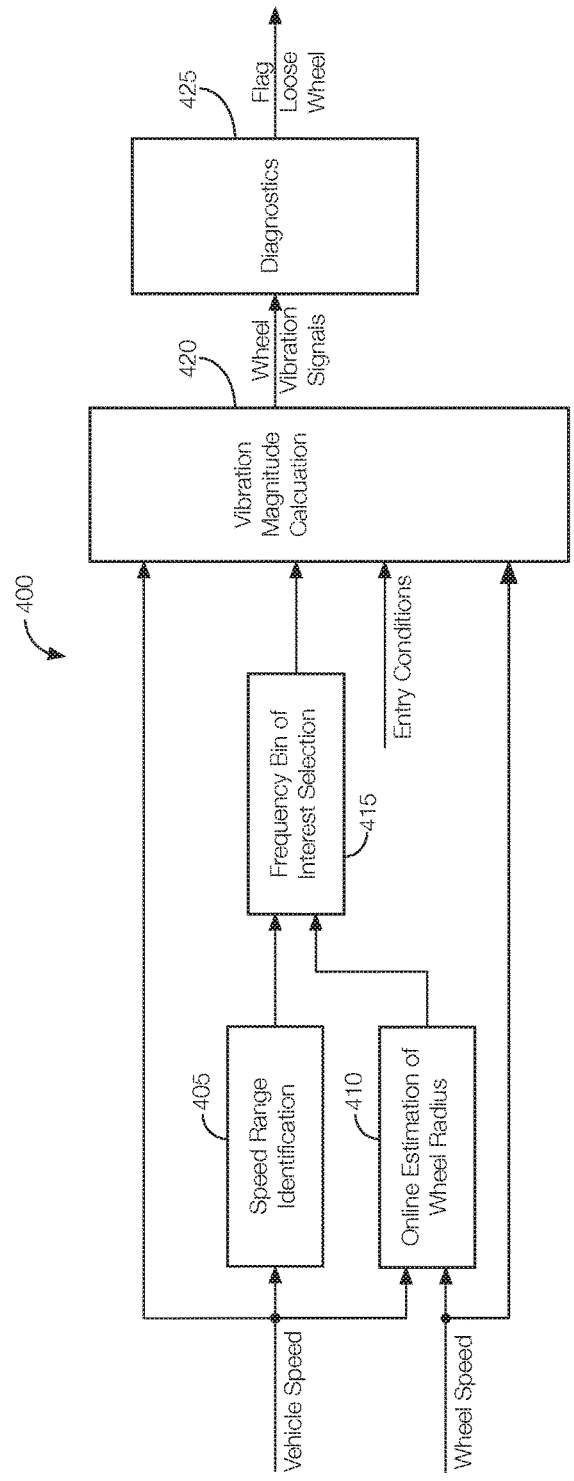
FIG. 4 is a block diagram illustrating loose wheel detection.

FIG. 4 is a block diagram 400 illustrating how the processor 145 of the autonomous vehicle controller 125 is programmed to detect a loose wheel.

At block 405, the autonomous vehicle controller 125 identifies the speed range. That is, the autonomous vehicle controller 125 is programmed to receive the vehicle speed from the vehicle speed sensor 120 and determine a minimum and maximum vehicle speed, $V_{smin}$ and $V_{smax}$, respectively, based on the instantaneous vehicle speed.

At block 410, the autonomous vehicle controller 125 performs an online estimate of the wheel radius. The autonomous vehicle controller 125 may perform the online estimate of the wheel radius, $r_w$, for each wheel of the host vehicle 100. The online estimate of the wheel radius may be calculated according to Equation 9, below, $$r_w = \frac{1609V_s}{60^2 W_s} \quad (9)$$

where $V_s$ is the instantaneous vehicle speed in miles per hour, $W_s$ is the wheel speed in radians per second, and $r_w$ is the wheel radius in meters.

At block 415, the autonomous vehicle controller 125 selects a frequency bin of interest. The frequency bin of interest may be selected according to the speed range determined at block 405 and the wheel radius determined at block 410. The frequency bin of interest may be defined by a minimum and maximum frequency range, $f_{min}$ and $f_{max}$, respectively. Equations 10 and 11 define a frequency, f, in the selected frequency bin.

$$f_{min} \leq f \leq f_{max} \quad (10)$$

$$\frac{1609V_{smin}}{3600 \times 2\pi r_w} \leq f \leq \frac{1609V_{smax}}{3600 \times 2\pi r_w} \quad (11)$$

At block 420, the autonomous vehicle controller 125 computes the vibration magnitude of each wheel. The vibration magnitude may be a function of the selected frequency, the wheel speeds measured by the wheel speed sensors 115, and the entry conditions, which include whether the brake is being applied and the vehicle yaw. For instance, the autonomous vehicle controller 125 may develop intermediate signals, s(n), for each wheel speed and for the selected frequency bin in accordance with Equations 1 and 5, above, and wherein the selected frequency bin, k, is defined as follows:

$$k = \int N\frac{f}{F_s} \quad (12)$$

The autonomous vehicle controller 125 may determine the magnitude of each tire's vibration given the result of Equation 1 for each tire, as shown above in Equation 8. With the magnitude of each tire vibration, the autonomous vehicle controller 125 may calculate a recursive mean of the vibration magnitude using the data corresponding to the entry conditions (e.g., the vehicle is traveling in a straight line and no brake is applied). When a new vibration magnitude $Mag_{i+1}$ is added, the recursive mean may be calculated as follows:

$$\mu(i+1) = \frac{i}{i+1} \times \left[\mu(i) + \frac{Mag_{i+1}}{i}\right] \quad (13)$$

The autonomous vehicle controller 125 may output the vibration mean for each wheel as a result of block 420.

At block 425, the autonomous vehicle controller 125 compares the vibration means output at block 420 to thresholds representing a loose wheel. The thresholds may be stored in the memory 140. If the vibration mean exceeds the threshold, the autonomous vehicle controller 125 is programmed to set a flag indicating excessive (or abnormal) tire vibration suggesting a loose wheel. Setting a flag may include setting a diagnostic trouble code. The autonomous vehicle controller 125 may be further programmed to take another action such as presenting an alert inside the host vehicle 100, selecting a minimum risk condition event, or the like. Minimum risk condition events may include autonomously operating the host vehicle 100 to pull over to the side of the road, stop in the lane, or travel to a service station.

Figure 5:
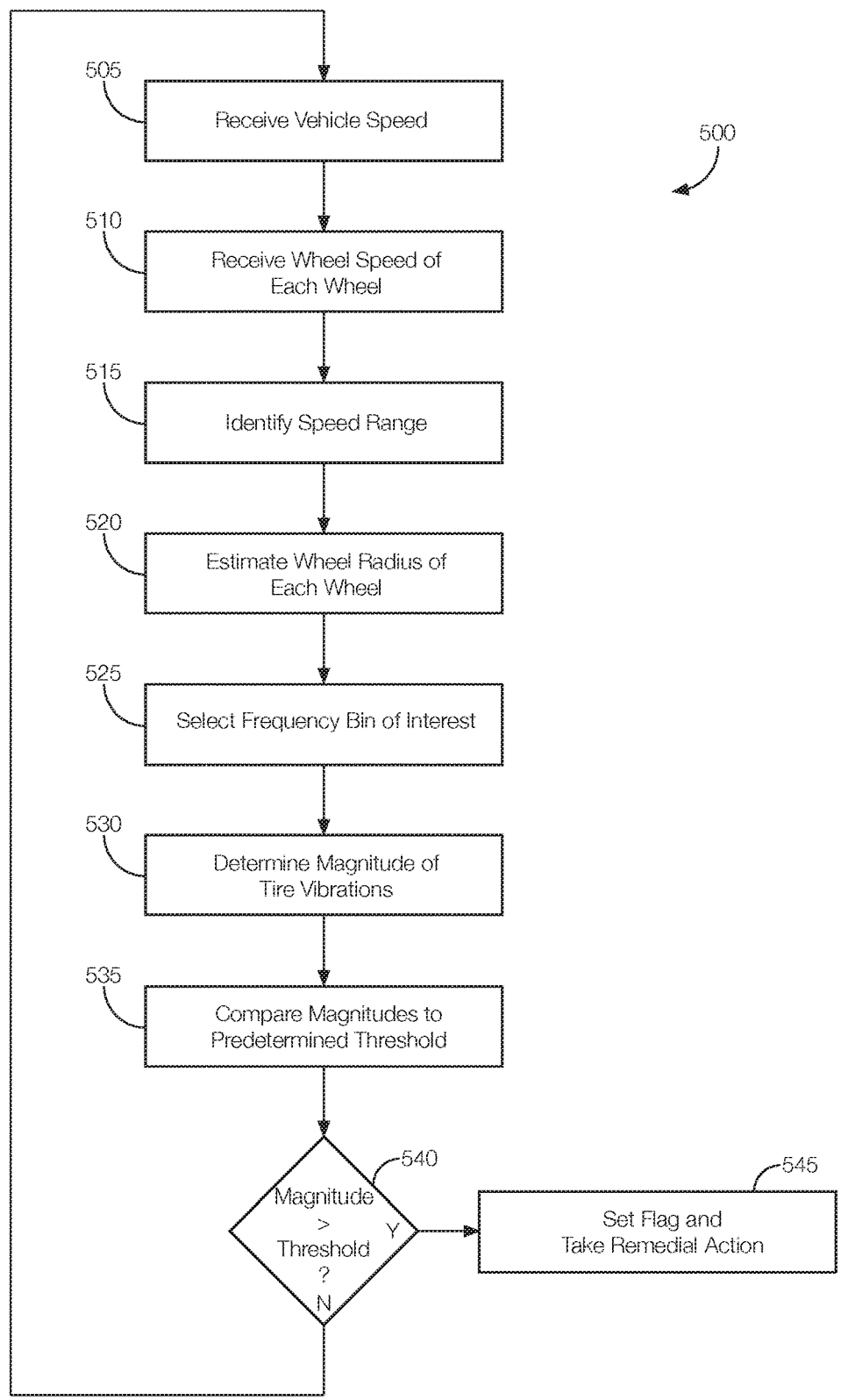
FIG. 5 is a flowchart of an example process of tire vibration and loose wheel detection.

FIG. 5 illustrates a flowchart of an example process 500 that may be executed by the host vehicle 100 to detect excessive tire vibration and a loose wheel.

At block 505, the autonomous vehicle controller 125 receives the vehicle speed. The vehicle speed may be received by the processor 145 of the autonomous vehicle controller 125 from, e.g., the vehicle speed sensor 120.

At block 510, the autonomous vehicle controller 125 receives the wheel speed for each wheel of the host vehicle 100. The wheel speeds may be output by, e.g., the wheel speed sensors 115 and received by the processor 145 of the autonomous vehicle controller 125.

At block 515, the autonomous vehicle controller 125 identifies a speed range. The speed range may be identified via the processor 145 of the autonomous vehicle controller 125 as explained above with respect to block 405.

At block 520, the autonomous vehicle controller 125 estimates the wheel radius. The processor 145 of the autonomous vehicle controller 125 estimates the wheel radius as explained above with respect to block 410.

At block 525, the autonomous vehicle controller 125 selects a frequency bin of interest. The processor 145 of the autonomous vehicle controller 125 may select the frequency bin of interest as explained above with regard to block 415.

At block 530, the autonomous vehicle controller 125 determines the magnitude of the tire vibrations. The processor 145 of the autonomous vehicle controller 125 may determine the magnitude of the tire vibrations using a Goertzel-based computation, as discussed above with respect to FIG. 3 and block 420.

At block 535, the autonomous vehicle controller 125 compares the magnitudes of the tire vibrations resulting from block 530 to a predetermined threshold. That is, the processor 145 of the autonomous vehicle controller 125 may make such a comparison as explained above with respect to block 425.

At decision block 540, the autonomous vehicle controller 125 determines if the magnitude of any of the tire vibrations exceeds the threshold. The processor 145 may do so by comparing the magnitude of each tire vibration to the threshold. If a tire vibration exceeds the threshold, the process 500 may proceed to block 545 since vibrations exceeding the threshold may indicate a loose wheel. Otherwise, the process 500 may return to block 505.

At block 545, the autonomous vehicle controller 125 sets a flag and takes a remedial action. For instance, the processor 145 of the autonomous vehicle controller 125 may set a diagnostic trouble code flag and may further initiate a minimum risk condition event. The minimum risk condition event may include autonomously operating the host vehicle 100 to pull over to the side of the road, stop in the lane, or navigate to a service station.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
  a memory; and
  a processor programmed to execute instructions stored in the memory, the instructions including:
    receiving a wheel speed from a wheel speed sensor;
    receiving a vehicle speed from a vehicle speed sensor;
    identifying a speed range from the vehicle speed;
    estimating a wheel radius from the wheel speed sensor;
    selecting a frequency bin of interest according to the speed range and the estimated wheel radius;
    determining a mean vibration magnitude relative to the selected frequency bin of interest; and
    detecting a vibrating vehicle wheel based on the mean vibration magnitude.

2. The vehicle computer of claim 1, wherein the processor is programmed to generate an intermediate signal for the vehicle wheel based on the wheel speed and the selected frequency bin of interest.

3. The vehicle computer of claim 2, wherein the processor is programmed to determine the mean vibration magnitude based at least in part on the intermediate signal.

4. The vehicle computer of claim 1, wherein the processor is programmed to recursively determine the mean vibration magnitude.

5. The vehicle computer of claim 1, wherein the processor is programmed to detect the vibrating vehicle wheel by comparing the mean vibration magnitude to a threshold.

6. The vehicle computer of claim 5, wherein the processor is programmed to detect the vibrating vehicle wheel as a result of determining that the mean vibration magnitude exceeds the threshold.

7. The vehicle computer of claim 1, wherein the processor is programmed to autonomously operate a host vehicle in accordance with a remedial action as a result of detecting the vibrating vehicle wheel.

8. A method comprising:
  receiving a wheel speed from a wheel speed sensor;
  receiving a vehicle speed from a vehicle speed sensor;
  identifying a speed range from the vehicle speed;
  estimating a wheel radius from the wheel speed sensor;
  selecting a frequency bin of interest according to the speed range and the estimated wheel radius;
  determining a mean vibration magnitude relative to the selected frequency bin of interest; and
  detecting a vibrating vehicle wheel based on the mean vibration magnitude.

9. The method of claim 8, further comprising generating an intermediate signal for the vehicle wheel based on the wheel speed and the selected frequency bin of interest.

10. The method of claim 9, further comprising determining the mean vibration magnitude based at least in part on the intermediate signal.

11. The method of claim 8, wherein determining the mean vibration magnitude includes recursively determining the mean vibration magnitude.

12. The method of claim 8, wherein detecting the vibrating vehicle wheel includes comparing the mean vibration magnitude to a threshold.

13. The method of claim 12, wherein detecting the vibrating vehicle wheel includes detecting the vibrating vehicle wheel as a result of determining that the mean vibration magnitude exceeds the threshold.

14. The method of claim 8, further comprising autonomously operating a host vehicle in accordance with a remedial action as a result of detecting the vibrating vehicle wheel.

* * * * *